(12) United States Patent
Eberbach et al.

(10) Patent No.: US 10,942,833 B2
(45) Date of Patent: Mar. 9, 2021

(54) MONITORING ROUTINES AND PROVIDING REMINDERS

(71) Applicant: International Business Machines Corporation, Armonk, NY (US)

(72) Inventors: Adam Eberbach, Surrey Hills (AU); Josh Andres, Melbourne (AU); Lenin Mehedy, Doncaster East (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/245,855

(22) Filed: Jan. 11, 2019

(65) Prior Publication Data

US 2020/0226046 A1 Jul. 16, 2020

(51) Int. Cl.
| | |
|---|---|
| *G06F 11/30* | (2006.01) |
| *H04L 29/08* | (2006.01) |
| *G06N 20/00* | (2019.01) |
| *G06F 1/16* | (2006.01) |
| *G08B 31/00* | (2006.01) |
| *G06K 9/62* | (2006.01) |
| *G06Q 10/06* | (2012.01) |

(52) U.S. Cl.
CPC .......... *G06F 11/3072* (2013.01); *G06F 1/163* (2013.01); *G06K 9/6256* (2013.01); *G06N 20/00* (2019.01); *G06Q 10/06311* (2013.01); *G08B 31/00* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 7,552,030 B2 | 6/2009 | Guralnik et al. | |
| 7,577,522 B2 | 8/2009 | Rosenberg | |
| 9,111,233 B2 | 8/2015 | Elumalai et al. | |
| 9,767,694 B1 * | 9/2017 | Wells | G08G 1/166 |
| 9,770,382 B1 * | 9/2017 | Ellis | G01C 21/00 |

(Continued)

FOREIGN PATENT DOCUMENTS

WO 2017/130207 A1 8/2017

OTHER PUBLICATIONS

Anonymous; "DIY bluetooth button—How to build your own smart IoT buttons"; <https://www.nominet.uk/how-to-build-your-own-smart-iot-buttons/>; Saved from the World Wide Web on Jan. 11, 2019; 6 pages.

*Primary Examiner* — Chico A Foxx
(74) *Attorney, Agent, or Firm* — Cantor Colburn LLP; Joseph Petrokaitis (57) ABSTRACT

A computer system, computer program product and computer-implemented method for performing a task. The computer system includes a sensor and a processor. The sensor is attachable to an article and is sensitive to a parameter indicative of a pattern of use of the article. The processor is configured to: determine a standard pattern of use of the article from a measurement of the parameter obtained during a training period, determine a tracked pattern of use of the article from a measurement of the parameter obtained during a tracking period, and generate a reminder to perform the task when the tracked pattern of use deviates from the standard pattern of use. A device receives the reminder in order to presenting the reminder to a user.

18 Claims, 5 Drawing Sheets

(56) References Cited

U.S. PATENT DOCUMENTS

| | | | |
|---|---|---|---|
| 10,038,945 B2 | 7/2018 | Gilberton et al. | |
| 10,614,688 B1* | 4/2020 | Pachikov | G08B 25/009 |
| 2003/0056119 A1* | 3/2003 | Pisarsky | H04L 29/12254 |
| | | | 726/21 |
| 2009/0146795 A1* | 6/2009 | Matsumoto | G06Q 10/06 |
| | | | 340/10.5 |
| 2009/0245029 A1 | 10/2009 | Kam | |
| 2010/0208063 A1* | 8/2010 | Lee | G06K 9/00771 |
| | | | 348/143 |
| 2011/0178969 A1* | 7/2011 | Falchuk | G06N 5/04 |
| | | | 706/45 |
| 2014/0200426 A1* | 7/2014 | Taub | A61B 5/14532 |
| | | | 600/347 |
| 2014/0205155 A1* | 7/2014 | Chung | G06K 9/00362 |
| | | | 382/115 |
| 2014/0229412 A1* | 8/2014 | Gupta | G06N 5/04 |
| | | | 706/20 |
| 2015/0131850 A1* | 5/2015 | Qvarfordt | G06K 9/00617 |
| | | | 382/103 |
| 2015/0143281 A1* | 5/2015 | Mehta | G06Q 10/10 |
| | | | 715/781 |
| 2015/0200899 A1 | 7/2015 | Sanketi | |
| 2016/0054903 A1* | 1/2016 | Jeong et al. | G06F 3/0484 |
| 2016/0110984 A1* | 4/2016 | Seol | G08B 21/02 |
| | | | 340/539.13 |
| 2016/0356641 A1* | 12/2016 | Larson | H04W 4/70 |
| 2017/0017776 A1* | 1/2017 | Soulos | G06F 19/3475 |
| 2017/0142247 A1* | 5/2017 | Heo | H04W 4/70 |
| 2017/0265785 A1* | 9/2017 | Vaughn | A61B 5/1123 |
| 2018/0046833 A1 | 2/2018 | Havas et al. | |
| 2018/0108242 A1* | 4/2018 | Wilkinson | H04W 4/029 |
| 2019/0114244 A1* | 4/2019 | Salunke | G06F 11/34 |
| 2019/0180598 A1* | 6/2019 | Wilkinson | H04W 4/029 |
| 2019/0325736 A1* | 10/2019 | Zhang | G06K 9/00818 |
| 2019/0354875 A1* | 11/2019 | Madden | G06N 20/00 |
| 2019/0356505 A1* | 11/2019 | Madden | H04L 12/2812 |
| 2020/0007540 A1* | 1/2020 | Kawaguchi | G06F 21/602 |

* cited by examiner

MONITORING ROUTINES AND PROVIDING REMINDERS

BACKGROUND

The present invention relates generally to computing devices for providing reminders to an individual and, more specifically, to computing systems and computer-implemented methods for monitoring an individual's routine and to provide reminders when an established routine is broken.

Many computer-based reminder systems exist to remind people to perform certain tasks, such as taking garbage to the curb for collection or turning off lights when leaving the house. These reminder systems generally require the computer to be programmed by or have data entered by a user in order to be set up. Setting up the reminder system can be more troublesome than performing the task itself. In addition, a change occurring in a routine requires reprogramming of the computer or entering of new data.

SUMMARY

Embodiments of the present invention are directed to a computer-implemented method for performing a task. A non-limiting example of the computer-implemented method includes: measuring, via a sensor attached to an article, a parameter during a training period, the parameter indicative of a pattern of use of the article; determining, from the parameter, a standard pattern of use of the article from a measurement of the parameter during the training period; measuring the parameter during a tracking period; determining a tracked pattern of use of the article during the tracking period from a measurement of the parameter during the tracking period; and generating the reminder to perform the task when the tracked pattern of use deviates from the standard pattern of use.

Embodiments of the present invention are directed to a computer system for performing a task. A non-limiting example of the computer system includes a sensor coupled to an article, the sensor sensitive to a parameter indicative of a pattern of use of the article; a processor configured to: determine a standard pattern of use of the article from a measurement of the parameter obtained during a training period; determine a tracked pattern of use of the article from a measurement of the parameter obtained during a tracking period; generate a reminder to perform the task when the tracked pattern of use deviates from the standard pattern of use; and a device receptive to the reminder for presenting the reminder to a user.

Embodiments of the present invention are directed to a computer program product for performing a task. A non-limiting example of the computer program product includes a computer readable storage medium having program instructions embodied therewith, the program instructions executable by a processor to cause the processor to perform: measuring, via a sensor attached to an article, a parameter during a training period, the parameter indicative of a pattern of use of the article; determining, from the parameter, a standard pattern of use of the article from a measurement of the parameter during the training period; measuring the parameter during a tracking period; determining a tracked pattern of use of the article during the training period from a measurement of the parameter during the tracking period; and generating a reminder to perform the task when the tracked pattern of use deviates from the standard pattern of use.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

An embodiment disclosed herein discloses a computer-implemented method and computer system for generating a reminder for a task or event. A sensor monitors a parameter during a training period. The computer system determines a standard pattern of use of an article from the parameter. The sensor then monitors the parameter during a tracking period. The computer system determines a tracked pattern of use of the article during the tracking period and generates the reminder when the tracked pattern of use deviates from the standard pattern of use. The computer system can use a machine learning process to determine the standard routine.

Machine Learning gives computers the ability to "learn" without being explicitly programmed. Machine learning explores the study and construction of algorithms that can learn from and make predictions on data. Such algorithms overcome following strictly static program instructions by making data-driven predictions or decisions, through building a model from sample inputs. Machine Learning can be supervised, unsupervised or reinforced. In supervised learning, a computer is presented with example inputs and their desired outputs, given by a "teacher," with the goal of learning a general rule that maps inputs to outputs. In unsupervised learning, no labels are given to the learning algorithm, leaving it on its own to find structure in its input. Unsupervised learning can be a goal in itself (such as discovering hidden patterns in data) or a means towards an end (such as feature learning). In reinforcement learning, a computer program interacts with a dynamic environment in which it must perform a certain goal (such as driving a vehicle or playing a game against an opponent). The program is provided feedback in terms of rewards and punishments as it navigates its problem space.

Figure 1:
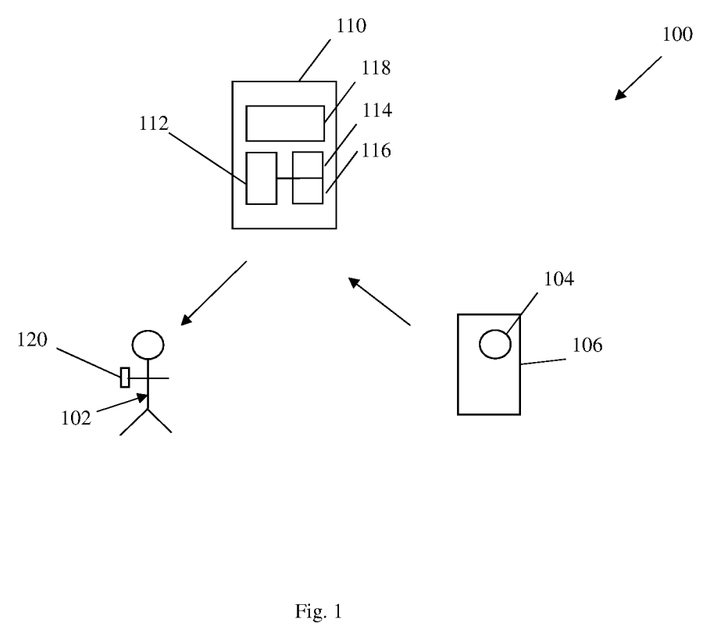
FIG. 1 shows a computer-implemented reminder system which provides a reminder to a user to perform a task.

Turning now to FIG. 1, FIG. 1 shows a computer-implemented reminder system 100 which provides a reminder to a user 102 to perform a task. A sensor 104 is applied, attached or affixed to an article 106. The article 106 is an article that is affected when the user 102 performs the task. The sensor 104 can be any type of sensor that measures an environmental parameter, such as an accelerometer, gyroscope, Global Position Satellite (GPS) or other suitable sensor that measuring a motion, a position sensor, rotation, etc. The sensor 104 can also be a temperature sensor or pressure sensor, in various embodiments. The sensor 104 provides measurements to a control unit 110. The control unit 110 includes a processor 112, memory storage device 114 and programs and instructions 116 stored in the memory storage device 114. Upon being accessed by the processor 112, the programs and instructions 116, allow the processor 112 to perform various functions disclosed herein, include, monitoring actions performed at the article 106, determining a standard pattern of use (or a standard routine) of the article 106 and generating a reminder or alert when a tracked pattern of use deviates from the standard pattern. The control unit 110 can further run a machine learning module 118 to determine the standard pattern of use from the measurements of the environmental parameter. When the tracked pattern deviates from the standard pattern, the control unit 110 can communicate with a device 120, such as a mobile device, associated with the user 102 to send a reminder to the user 102 to perform the task. The control unit 110 can communicate with the device 120 using a suitable communication protocol, such as WiFi, Bluetooth, cellular communication, etc. The control unit 120 can send a reminder in various forms, such as an email or a flashing light. While shown as a separate component, the control unit 110 can be an integrated component of the device 120. In another embodiment, the control unit 110 can be an integrated component of the sensor 104.

With the sensor 104 attached to the article 106, the user 102 trains the reminder system 100 to determine a standard pattern of use of the article 106. The user 102 performs a task or function using the article 106, allowing the sensor 104 to record the motions or actions involved in the task with respect to the article 106. For example, the article 106 can be a trash can, and the sensor 104 can obtain measurements that indicate the user 102 moving the trash can from its location in a garage to a location on a sidewalk on the evening before a scheduled trash pick-up (e.g., Monday evening at 10 p.m.). The sensor 104 can later obtain measurements that indicate that the user 102 moves the trash can from its location on the sidewalk back to the garage, upon returning from work the next day (e.g., Tuesday afternoon at 7 p.m.). When the user 102 moves the trash can, the sensor 104 records both the movement of the trash can as well as the time at which the movement occurs. By recording the movements and the times of the movements over a training period, such as the period of a week, the sensor 104 determines a standard pattern of use of the trash can or a standard routine with respect to the trash can. In particular, the sensor 104 determines that a standard routine includes moving the trash can to the sidewalk on Monday evenings and returning to the garage on Tuesday afternoons. In various embodiments, the training period during which the sensor 104 monitors the movement of the trash can be a plurality of time periods, such as a plurality of weeks. The control unit 110 identifies the standard pattern using measurements obtained over the plurality of time periods.

Figure 2:
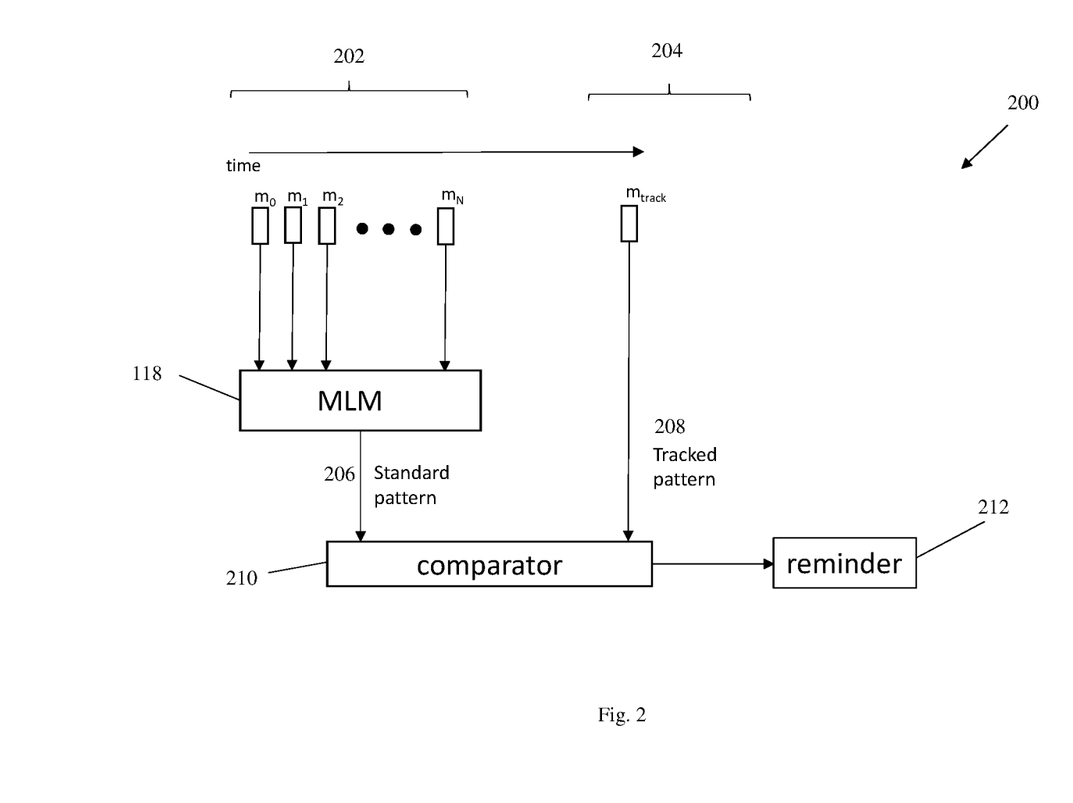
FIG. 2 is a schematic diagram illustrating an operation of the computer-implemented reminder system of FIG. 1.

Once the standard pattern has been established, the control unit 110 can determine a deviation from the standard pattern that may be due to laziness or forgetfulness on the part of the user 102 and send a relevant reminder to a device 120 associated with the user 102. During a tracking period 204, the sensor 104 continues to monitor the parameter. The processor 112 compares the parameter of the tracked pattern to the standard parameter for the standard pattern. When the parameter of the tracked pattern during the tracking period differs from the standard parameter, the processor 112 generates a reminder to the user 102. The machine learning module 118 can determine and use a time threshold when sending a reminder in order to take into account and allow for variations in human behavior. For example, although the standard pattern of use includes taking the garbage to the curb at 10 p.m. on Monday evenings, the machine learning module 118 may further note a variation in this pattern of about a half hour. The machine learning module 118 thus can wait about a half hour after 10 p.m. before sending out a reminder.

In various embodiments, the processor 112 can send a text message to a device 120 associated with the user 102, generate a sound or rattle at the device 120, etc. In one embodiment, the user 102, upon receiving the reminder, can then set out to perform the routine, such as by taking the trash out to the sidewalk. Once the control unit 110 determines that the user 102 has performed the routine (by observing relevant measurements), the control unit 110 can then rescind its reminder or send a "thank you" note. In another embodiment, the user 102 can choose to ignore the reminder by sending a signal to the sensor 104 via the device 120. In the example of trash pickup, the user may be on vacation or the trash pickup may be cancelled due to a holiday. In yet another embodiment, the user 102 can reprogram the system by sending a signal to allow the tracked pattern to become a new standard pattern. This can be useful when a trash pickup day changes, for example.

FIG. 2 is a schematic diagram 200 illustrating an operation of the computer-implemented reminder system of FIG. 1. Measurements of environmental parameters with respect to the article 106, FIG. 1 are obtained during either a training period 202 or a tracking period 204. During the training period 202, measurements ($m_0$, $m_1$, $m_2$, ... $m_N$) are obtained at a series of times. The measurements are received at the machine learning module 118. The machine learning module 118 determines a standard pattern or standard routine with respect to the article from the measurements ($m_0$, $m_1$, $m_2$, ... $m_N$). During the tracking period 204, a tracked measurement $m_{track}$ is obtained, and a comparator 210 compares the tracked measurement $m_{track}$ with the standard pattern in order to determine whether the tracked pattern associated with the tracked measurement is the same or is different from the standard pattern. If there is a difference between the tracked pattern and the standard pattern, the comparator 210 sends a reminder 212.

In addition, the tracked measurement $m_{track}$ can be used with the measurements ($m_0$, $m_1$, $m_2$, ... $m_N$) to continue training the machine learning module 118. The tracked measurement $m_{track}$ can take place of the oldest of the measurements ($m_0$, $m_1$, $m_2$, ... $m_N$) so that the standard pattern of use is continuously updated.

Figure 3:
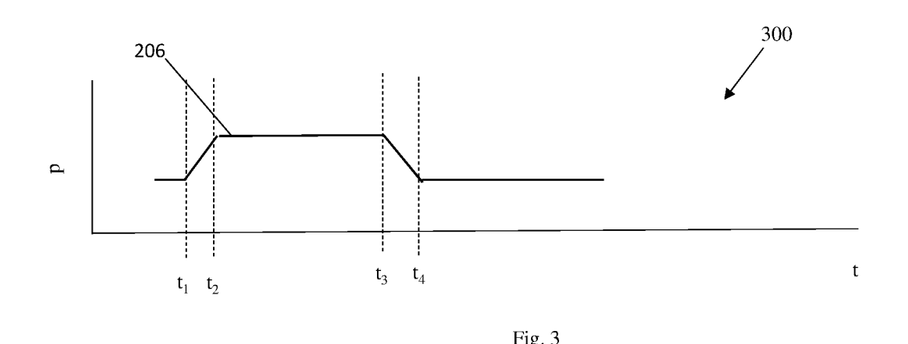
FIG. 3 is an illustrative graph showing a time-value of a parameter monitored by a sensor attached to an article.

FIG. 3 is an illustrative graph 300 showing a time-value of a parameter monitored by a sensor attached to an article. The length of time can be any selected time frame. For example, the time frame can be a week-long time frame, a day-long time frame, an hour-long time frame, a month-long time frame, etc. The illustrative graph 300 shows that the parameter changes from a first value at time $t_1$ to settle on a second value at time $t_2$. Later, at time $t_3$ the parameter changes from the second value to reestablish itself at the first value at time $t_4$. This pattern is for illustrative purposes only. The processor 112 can then determine a standard pattern 206 based on the changes in the parameter values and the times at which these changes occur.

Figure 4:
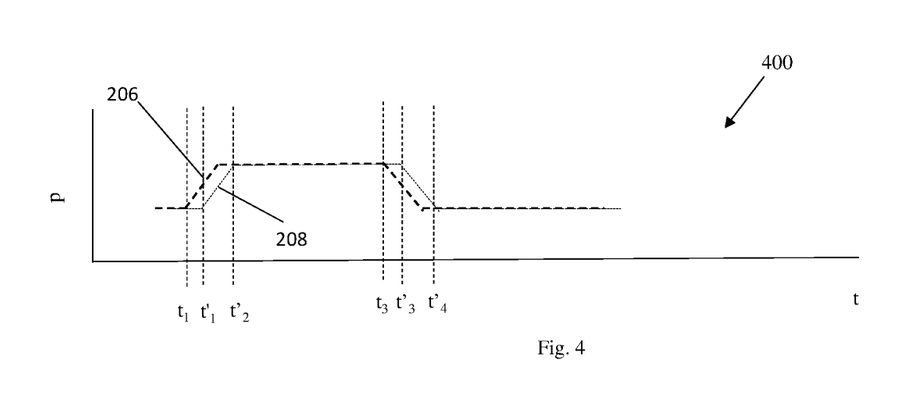
FIG. 4 depicts a graph illustrating operation of the reminder system in performing a task by the user.

FIG. 4 depicts a graph 400 illustrating operation of the reminder system in performing a task by the user. The standard pattern 206 determined during the training period of FIG. 3 is shown on graph 400. Further shown on graph 400 is a tracked pattern 208. At time $t_1$, the tracked pattern 208, as determined by the sensor 104, is seen to deviate from the standard pattern 206. Upon determining this deviation, the processor 112 sends a reminder to the user or a mobile device. As the user receives the reminder, the user performs actions that changes the value of the parameter, e.g., by moving the trash can to the sidewalk. Times $t_1'$ and $t_2'$ illustrate the times at which the user, being reminded of the task, begins ($t_1'$) and completes ($t_2'$) the task. Just after time $t_2'$, the standard pattern 206 and the tracked pattern 208 are the same or substantially the same. At time $t_3$, the tracked pattern 208 is seen to once again deviate from the standard pattern 206, causing a reminder to be sent to the user to perform an action. Times $t_3'$ and $t_4'$ illustrate the times at which the user, being reminded of the task, begins ($t_3'$) and completes ($t_4'$) the task. Just after time $t_4'$, the standard pattern 206 and the tracked pattern 208 are the same or substantially the same.

Figure 5:
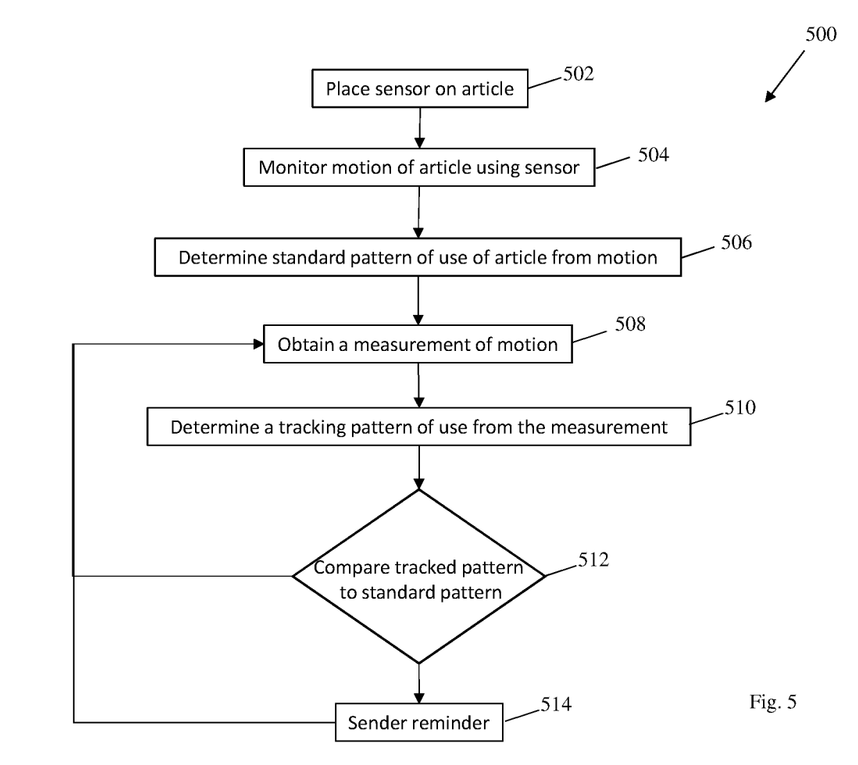
FIG. 5 shows a flowchart of the computer-implemented method for performing a task disclosed herein.

FIG. 5 shows a flowchart 500 of the computer-implemented method for performing a task disclosed herein. In box 502, a sensor is attached to an article with respect to which the task is to be performed. In box 504, a motion of the article is monitored using the sensor during a training period. The motion of the article is indicative of the task being performed at the article. In box 506, a standard pattern of use of the article is determined from the motion of the article. In box 508, a measurement of the motion of the article is obtained during a tracking period. In box 510, a tracking pattern of use of the article is determined from the measurement of motion during the tracking period. In decision box 512, the tracked pattern is compared to the standard pattern. If, at box 512, there is no divergence between the tracked pattern and the standard pattern, the process returns to box 508 to continue monitoring of the motion of the article. If, at box 512, there is a divergence between tracked pattern and the standard pattern, the process continues to box 514 where a reminder is sent to a user to perform the task. From box 514, the process can then return to box 508 to continue monitoring the motion of the article, for example, to determine compliance of the user with the reminder.

Figure 6:
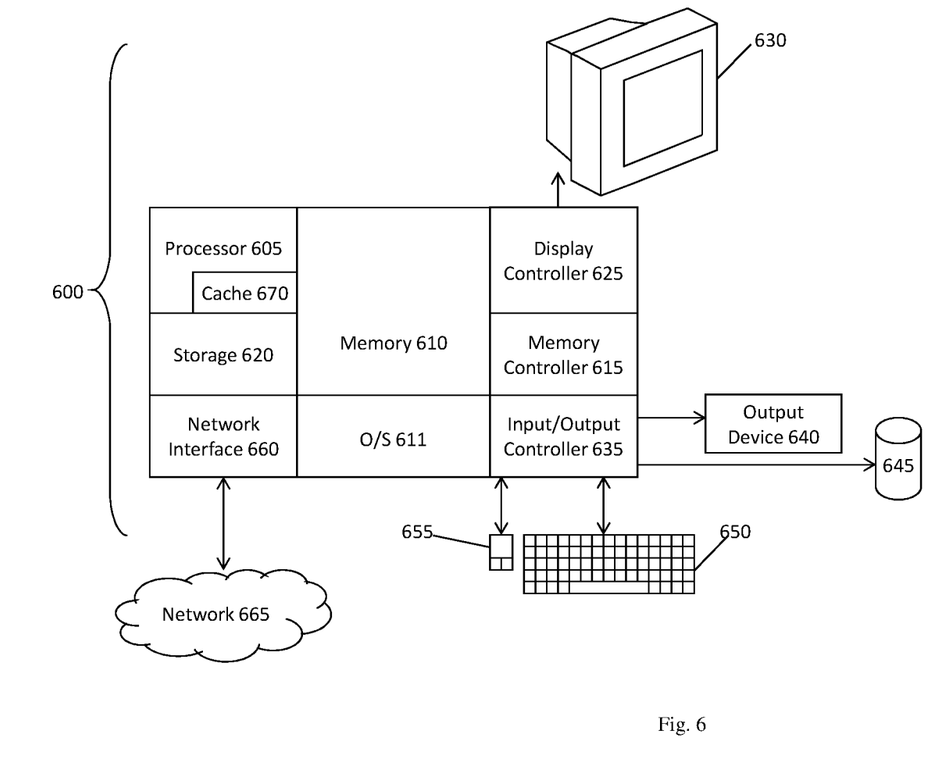
FIG. 6 illustrates a block diagram of a computer system for use in implementing a system or method according to some embodiments.

FIG. 6 illustrates a block diagram of a computer system 600 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computer system 600, such as a personal computer, workstation, minicomputer, or mainframe computer.

In some embodiments, as shown in FIG. 6, the computer system 600 includes a processor 605, memory 610 coupled to a memory controller 615, and one or more input devices 645 and/or output devices 640, such as peripherals, that are communicatively coupled via a local I/O controller 635. These devices 640 and 645 may include, for example, a printer, a scanner, a microphone, and the like. Input devices such as a conventional keyboard 650 and mouse 655 may be coupled to the I/O controller 635. The I/O controller 635 may be, for example, one or more buses or other wired or wireless connections, as are known in the art. The I/O controller 635 may have additional elements, which are omitted for simplicity, such as controllers, buffers (caches), drivers, repeaters, and receivers, to enable communications.

The I/O devices 640, 645 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 605 is a hardware device for executing hardware instructions or software, particularly those stored in memory 610. The processor 605 may be a custom made or commercially available processor, a central processing unit (CPU), an auxiliary processor among several processors associated with the computer system 600, a semiconductor based microprocessor (in the form of a microchip or chip set), a macroprocessor, or other device for executing instructions. The processor 605 includes a cache 670, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 670 may be organized as a hierarchy of more cache levels (L1, L2, etc.).

The memory 610 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, or other types of storage media. Note that the memory 610 may have a distributed architecture, where various components are situated remote from one another but may be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially may control the execution of other computer programs and provides scheduling, input-output control, file and data management, memory management, and communication control and related services.

Additional data, including, for example, instructions for the processor 605 or other retrievable information, may be stored in storage 620, which may be a storage device such as a hard disk drive or solid state drive. The stored instructions in memory 610 or in storage 620 may include those enabling the processor to execute one or more aspects of the systems and methods of this disclosure.

The computer system 600 may further include a display controller 625 coupled to a display 630. In some embodiments, the computer system 600 may further include a network interface 660 for coupling to a network 665. The network 665 may be an IP-based network for communication between the computer system 600 and an external server, client and the like via a broadband connection. The network 665 transmits and receives data between the computer system 600 and external systems. In some embodiments, the network 665 may be a managed IP network administered by a service provider. The network 665 may be implemented in a wireless fashion, e.g., using wireless protocols and technologies, such as WiFi, WiMax, etc. The network 665 may also be a packet-switched network such as a local area network, wide area network, metropolitan area network, the Internet, or other similar type of network environment. The network 665 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computer systems 600, such as that illustrated in FIG. 6.

Technical effects and benefits of some embodiments include improving a tagging process of an image, and improved training of a network in order to tag an image The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for performing a task, the computer-implemented method comprising:
    measuring, via a sensor attached to an article, a parameter during a training period using a processor, the parameter indicative of a pattern of use of the article;
    determining, from the parameter, a standard pattern of use of the article from a measurement of the parameter during the training period using the processor, the standard pattern of use determined based, at least in part on, executing a machine learning algorithm that learns the standard pattern via mapping of the measurement of the parameter during the training period;
    measuring, via the processor, the parameter during a tracking period;
    determining, via the processor, a tracked pattern of use of the article during the tracking period from a measurement of the parameter during the tracking period;
    determining, via the processor, the tracked pattern deviates from the standard pattern of use and a deviation time period during which the tracked pattern remains deviated from the standard pattern;
    generating, via the processor, a reminder to perform the task in response to determining that the tracked pattern of use deviates from the standard pattern of use and the deviation time period exceeds a time threshold; and
    continuing to monitor, via the processor, measurements related to the tracked pattern of use after the reminder is provided to determine compliance of a user with reminder,
    wherein the processor learns the time threshold being based on a time period at which the user achieves the compliance following deviation from the standard pattern of use.

2. The computer-implemented method of claim 1, wherein the standard pattern of use is a routine established by the user with respect to the article during the training period.

3. The computer-implemented method of claim 1, further comprising using machine learning to determine the standard pattern of use.

4. The computer-implemented method of claim 3 further comprising changing the standard pattern of use to a new pattern of use based on results of the machine learning.

5. The computer-implemented method of claim 1, further comprising cancelling the reminder upon instruction from the user.

6. The computer-implemented method of claim 1, wherein the standard pattern of use is a pattern that is expected to occur at least one of: (i) hourly; (ii) daily; (iii) weekly; and (iv) monthly.

7. The computer-implemented method of claim 1, wherein the standard pattern of use is a pattern that is expected to occur at least one of: (i) hourly; (ii) daily; (iii) weekly; and (iv) monthly.

8. The computer-implemented method of claim 1, wherein the article is different from the user.

9. A computer system for performing a task, the system comprising:
    a sensor coupled to an article, the sensor sensitive to a parameter indicative of a pattern of use of the article;
    a processor configured to:
    determine a standard pattern of use of the article from a measurement of the parameter obtained during a training period based, at least in part on, executing a machine learning algorithm that learns the standard pattern via mapping of the measurement of the parameter during the training period;
    determine a tracked pattern of use of the article from a measurement of the parameter obtained during a tracking period;
    determine the tracked pattern deviates from the standard pattern of use and a deviation time period during which the tracked pattern remains deviated from the standard pattern;
    generate a reminder to perform the task in response to determining that the tracked pattern of use deviates from the standard pattern of use and the deviation time period exceeds a time threshold; and
    continue to monitor measurements related to the tracked pattern of use after the reminder is provided to determine compliance of a user with reminder; and
    a device receptive to the reminder for presenting the reminder to a user, wherein the processor learns the time threshold being based on a time period at which the user achieves the compliance following deviation from the standard pattern of use.

10. The system of claim 9, wherein the standard pattern of use is a routine established by the user with respect to the article during the training period.

11. The system of claim 9, wherein the processor determines the standard pattern of use via a machine learning module.

12. The system of claim 11, wherein the processor is further configured to change the standard pattern of use to a new pattern based on results obtained at the machine learning module.

13. The system of claim 9, wherein the processor is further configured to cancel the reminder upon instruction from the user.

14. A computer program product for performing a task, the computer program product comprising a computer readable storage medium having program instructions embodied therewith, the program instructions executable by a processor to cause the processor to perform:
　measuring, via a sensor attached to an article, a parameter during a training period, the parameter indicative of a pattern of use of the article using the processor;
　determining, from the parameter, a standard pattern of use of the article from a measurement of the parameter during the training period using the processor, the standard pattern of use determined based, at least in part on, executing a machine learning algorithm that learns the standard pattern via mapping of the measurement of the parameter during the training period;
　measuring, via the processor, the parameter during a tracking period;
　determining, via the processor, a tracked pattern of use of the article during the training period from a measurement of the parameter during the tracking period;
　determining, via the processor, the tracked pattern deviates from the standard pattern of use and a deviation time period during which the tracked pattern remains deviated from the standard pattern;
　generating a reminder to perform the task in response to determining that the tracked pattern of use deviates from the standard pattern of use and the deviation time period exceeds a time threshold; and
　continuing, via the processor, to monitor measurements related to the tracked pattern of use after the reminder is provided to determine compliance of a user with reminder,
　wherein the processor learns the time threshold being based on a time period at which the user achieves the compliance following deviation from the standard pattern of use.

15. The computer program product of claim 14, wherein the standard pattern of use is a routine established by the user with respect to the article during the training period.

16. The computer program product of claim 14 further comprising using a machine learning process to determine the standard pattern of use.

17. The computer program product of claim 16 further comprising changing the standard pattern of use to a new pattern of use based on results of the machine learning.

18. The computer program product of claim 14, further comprising cancelling the reminder upon instruction from the user.

* * * * *